United States Patent
Kopczynski

[15] 3,688,592
[45] Sept. 5, 1972

[54] SPINDLE MOUNT FOR ROTARY AND AXIALLY MOVING POOL

[72] Inventor: John F. Kopczynski, 1671 Sweeney St., North Tonawanda, N.Y. 14120

[22] Filed: Dec. 15, 1970

[21] Appl. No.: 98,411

[52] U.S. Cl. ...................................74/109, 308/6 B
[51] Int. Cl. ...............................................F16h 21/44
[58] Field of Search ............74/33, 109; 308/6 A, 6 B

[56] References Cited

UNITED STATES PATENTS

| | | | |
|---|---|---|---|
| 2,655,414 | 10/1953 | Briney, Jr. | 308/6 B |
| 2,823,960 | 2/1958 | Blazek et al. | 308/6 B |
| 2,883,244 | 4/1959 | Berger | 308/6 B |
| 2,885,872 | 5/1959 | Burnette, Jr. | 308/6 B |
| 3,353,876 | 11/1967 | Moyer | 308/6 B |
| 3,453,898 | 7/1969 | Kopczynski | 74/109 |
| 3,514,166 | 5/1970 | Coley | 308/6 B |
| 3,434,760 | 3/1969 | Wendler | 308/6 B |

*Primary Examiner*—William F. O'Dea
*Assistant Examiner*—Wesley S. Ratliff, Jr.
*Attorney*—Sommer, Weber & Gastel

[57] ABSTRACT

A construction for mounting a spindle which rotates and travels axially including a housing, a bore in the housing defining a cylindrical bearing surface, a spindle having a portion located in the bore and a ball bearing assembly interposed between the spindle and the bore and including a ball bearing retaining sleeve mounting a plurality of ball bearings extending both axially and circumferentially of the spindle, and a force relieving area associated with the ball bearings for relieving forces on the ball bearings incidental to movement of the spindle, said force relieving area comprising a groove arrangement across which the ball bearings periodically pass so as to relieve the forces to which they are subjected.

10 Claims, 6 Drawing Figures

INVENTOR.
John F. Kopczynski
BY
Sommer, Weber & Gastel
ATTORNEYS

SPINDLE MOUNT FOR ROTARY AND AXIALLY MOVING POOL

The present invention relates to an improved spindle mounting construction for machine tools and the like.

By way of background, in certain machine tools there are rotating spindles which also move axially during machine operation. Such spindles may be supported in part by a ball bearing assembly which includes a sleeve mounted between the spindle and its housing, said sleeve carrying a large number of ball bearings in suitable sockets. Due to machining limitations there may be slight variation from exact concentricity between the spindle and the bore in which it is located, or there may be a slight variation in either the spindle or the bore from being exactly cylindrical throughout their lengths, or either may be slightly tapered. Due to the combined rotation of the spindle and axial movement thereof under conditions in which the foregoing variations are present, unequal forces may be exerted on the ball bearings which may cause drifting of the sleeve during machine operation, and in addition, cause unequal wear of the various sockets. It is with overcoming the foregoing deficiency of the prior art that the present invention is concerned.

It is one object of the present invention to provide an improved mounting construction between a spindle and its bore in which drifting of a bearing sleeve is minimized.

Another object of the present invention is to provide an improved mounting construction for spindles in which forces exerted on the ball bearings which mount the spindle are automatically relieved incidental to the operation of the spindle. Other objects and attendant advantages of the present invention will readily be perceived hereafter.

The present invention relates to an improved spindle mounting construction comprising a housing, a bore in the housing defining a cylindrical bearing surface, a spindle having a portion located in said bore, a ball bearing assembly including a ball bearing retaining sleeve interposed concentrically between the spindle and the bearing surface for a substantial portion of the length of the bore, a plurality of ball bearings mounted in the sleeve and extending for a substantial portion of the length of the sleeve and circumferentially thereof for engaging both said spindle and said bearing surface for maintaining the spindle in centered relationship in said bore while permitting both rotary and axial movement thereof, and a force relieving area associated with said ball bearings for periodically relieving the forces on the ball bearings incidental to the movement of the spindle in the bore. The various aspects of the present invention will be more fully understood when the following portions of the specification are read in conjunction with the accompanying drawings wherein:

Figure 5:
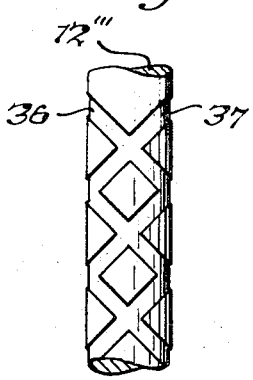
Figure 6:
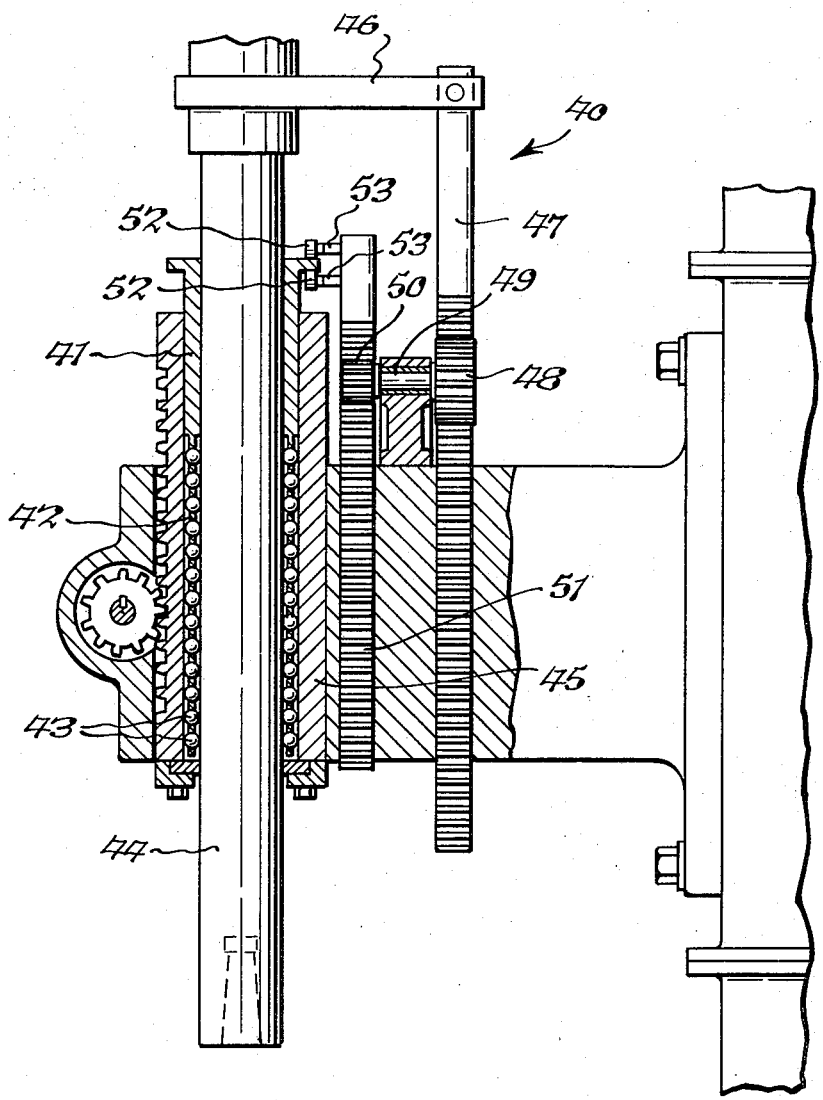

FIG. 5 is a fragmentary view of still another alternate embodiment comprising a spindle shaft having two opposite intersecting helical grooves for relieving forces on the bearings; and FIG. 6 is a fragmentary side elevational view partially in cross section showing a spindle mounted for rotary and axial movement in a ball bearing sleeve which is guided for movement in synchronized relationship to the axial movement of the spindle.

The subject matter of the present invention is an improvement over my previous U.S. Pat. No. 3,453,898 issued July 8, 1969.

The spindle mount of the present invention is primarily intended for use wherein a spindle is mounted for both rotary and axial movement as in machine tools such as drill presses or the like. However, it will be appreciated that it can be used in any environment to relieve forces which are exerted on ball bearings mounted in a sleeve.

Figure 1:
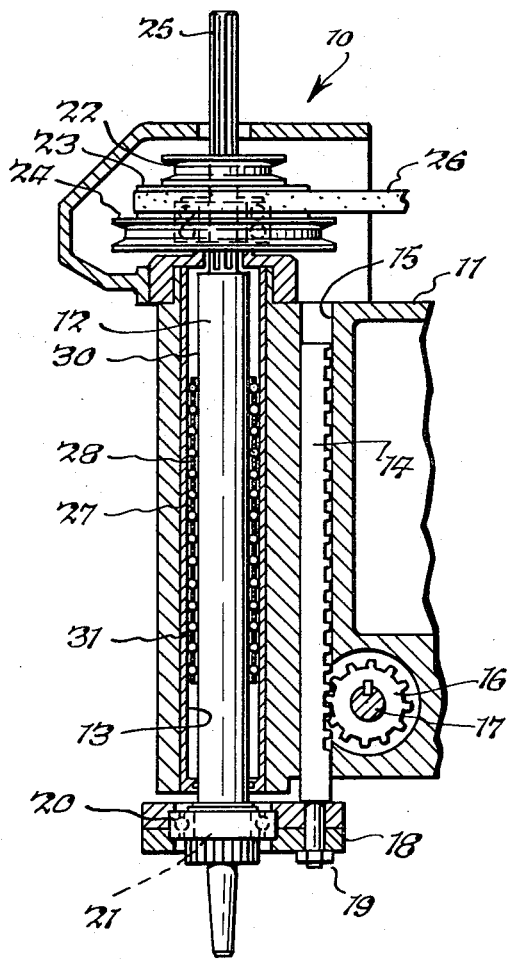
FIG. 1 is a fragmentary side elevational view, partially in cross section, showing a spindle mounted for rotary and axial movement within a housing.

In FIG. 1 a portion of a drill press 10 is shown including a housing 11 in which spindle 12 is mounted for both rotary and axial movement relative to bore 13. More specifically, housing 11 mounts a rack 14 for longitudinal sliding movement in slot 15. A pinion 16 which is suitably journaled in housing 11 is in mesh with rack 14 for causing it to reciprocate when a handle (not shown), which is keyed to shaft 17 on which pinion 16 is mounted, is manipulated. The lower end of rack 14 is attached to a two-piece holder 18 by means of nut 19. The outer race of bearing 20 is secured in holder 18 and the inner race is mounted on portion 21 of shaft 12. As can be seen, when rack 14 is reciprocated, spindle 12 will be carried along with it.

In order to impart rotation to spindle 12 a plurality of pulleys 22, 23 and 24 are attached to the splined end portion 25 of spindle 12. A belt 26 may encircle any of the aforementioned pulleys and when the belt is driven, it will rotate shaft 12 because of the splined connection between spindle 12 and the pulleys. It will be appreciated that the splined connection 25 permits spindle 12 to move axially while rotation is being imparted thereto.

In order to accurately support spindle 12 within bore 13 a ball bearing assembly 27 is provided. This assembly includes an elongated annular sleeve 28 which mounts a plurality of ball bearings 29 both axially and circumferentially of sleeve 28. Ball bearings 29 are preloaded in the sense that they are in pressure contact with both the outer surface 30 of the spindle and the inner surface 13 of the bore. In this particular instance the inner surface 13 is defined by an annular sleeve 31 which is inserted into housing 11.

Up to this point the above described structure may be identical to that shown in the above mentioned U.S. Pat. No. 3,453,898, which is incorporated here by reference.

It has been found that during rotation of spindle 12 unequal forces may be exerted on the various ball bearings 29 mounted in sleeve 28. This may be due to variations in size in the ball bearings and their sockets; the possible taper in the bore or of the spindle; the departure from true concentricity between the spindle and the bore; and the variation of the spindle and bore from a true cylindrical condition. Considering the high number of revolutions that the sleeve 28 experiences incidental to the rotation of spindle 12, it will be seen that the differences in the forces exerted on the various ball bearings 29 will be cumulative. For example, when there is a taper in either the spindle or the bore, the forces on opposite sides of certain of the ball bearings will not be from diametrically opposite sides thereby forcing the ball bearings subjected to such forces in a direction axially of the spindle. Furthermore, certain sockets 32 may be larger than in others because of wear or manufacturing tolerances which cause unequal forces on the ball bearings. There may also be factors which cause certain of the ball bearings 29 to be gripped more firmly between surfaces 13 and 30 than other ball bearings, which would cause such firmly gripped ball bearings to slip less than the others which may not be gripped as tightly. Thus, as a result of the foregoing factors, certain of the ball bearings 29 may press against the sleeve 28 with greater force in certain directions than other of the ball bearings. Therefore, there can be a net unbalance of forces which are set up on the ball bearings and the sleeve 28 in an axial direction which will tend to cause sleeve 28 to migrate or drift incidental to rotation of spindle 12. Furthermore, the unequal distribution of forces may cause uneven wear between certain of the ball bearings and their associated sockets 32. In other words, certain sockets 32 will wear more than others because they may be subjected to greater frictional forces during operation.

Figure 2:
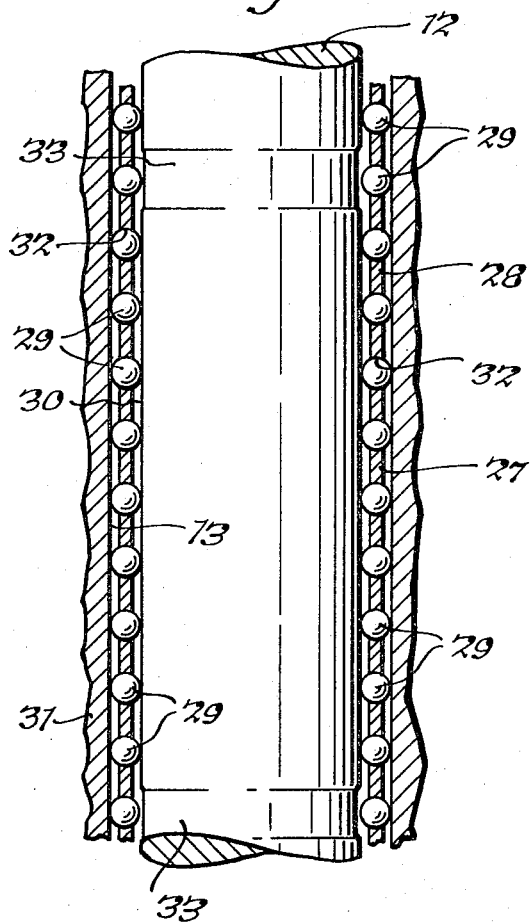
FIG. 2 is a fragmentary view, partially in cross section, showing in enlarged detail, a construction which can be associated with the spindle of FIG. 1 for the purpose of relieving forces on the bearings.

In accordance with the present invention, the above described forces are periodically eliminated so that the objectionable drifting of the sleeve 28 and the unequal wear of the sockets 29 is overcome. In the foregoing respect, one structural embodiment which tends to eliminate the forces referred to above is the spaced annular grooves 33 which may be formed in the outer surface of spindle 12. It can be seen from FIG. 2 that as the shaft 12 moves in an axial direction, the ball bearings 29 will pass across grooves 33, and in so doing will lose engagement with the outer surface of spindle 12. In so doing, all of the forces which have been set up on the ball bearings 29 prior to passing across grooves 33 will be relieved when such ball bearings pass across grooves 33.

Figure 3:
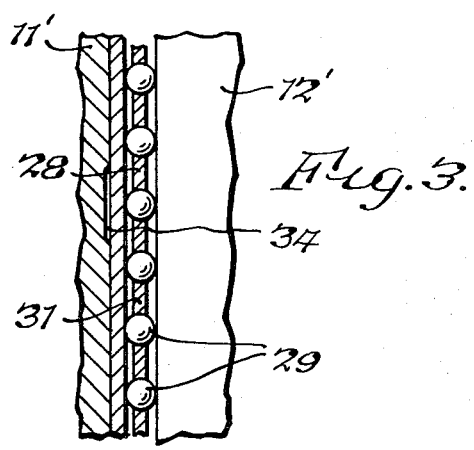
FIG. 3 is a fragmentary cross sectional view showing an alternate modification for relieving forces on the bearings.

An alternate embodiment for relieving forces is shown in FIG. 3 wherein housing 11', which is analogous to housing 11, includes an annular slot 33 behind sleeve 28. There may be a plurality of slots 34 spaced axially of sleeve 31. It will be seen that there will be a tendency of sleeve 31 to bow into slots 34 under the pressure exerted by the ball bearings 29 as they move across slot 34 and this will relieve the forces on the ball bearings 29.

Figure 4:
FIG. 4 is a fragmentary view of another alternate embodiment comprising a spindle having a helical groove thereon for relieving forces on the bearings.

A still further embodiment of the present invention is shown in FIG. 4 wherein spindle 12'' is shown as having a helical groove 35 therein. When spindle 12'' is placed in the environment of FIG. 1, it can be seen that as spindle 12'' rotates, the ball bearings 29 will cyclically cross helical groove 35 and in so doing the forces on ball bearings 29 will be relieved. The feature of structures such as shown in FIG. 4 is that there is almost constant cyclical relieving action of the forces on all of the ball bearings during rotation of the spindle 12'', whether or not it is being moved in an axial direction.

In FIG. 5 a still further embodiment of the present invention is shown wherein spindle 12''' is shown as having double helical grooves 36 and 37 therein with the helices extending in opposite directions. It will be appreciated that there is an even more frequent force relieving action in the embodiment of FIG. 5 than in the embodiment of FIG. 4.

In the embodiments of FIGS. 1–5, the sleeve 28 was free floating in the sense that there was no positive drive to the sleeve itself for the purpose of adjusting its position within the housing. If desired, the sleeve, such as 28, may be positively driven. This is shown in the machine 40 of FIG. 6 wherein ball bearing assembly 41 includes a sleeve 42 mounting a plurality of ball bearings 43, such sleeve being located between spindle 44 and sleeve 45. The embodiment as shown in FIG. 6 may be identical in all respects to that shown in FIG. 2 of U.S. Pat. No. 2,655,414, except that any of the stress relieving structures shown in FIGS. 1–5 of the present invention may be incorporated therein. U.S. Pat. No. 2,655,414 is therefore incorporated here by reference.

A suitable hand feed lever (not shown) is mechanically linked to spindle 44 for driving it axially. In addition, link 46 secures spindle 44 to rack 47 which is in mesh with pinion 48 keyed to shaft 49 on which pinion 50 is also keyed, pinion 50 being in mesh with rack 51 which effectively engages sleeve 42 through rollers 52 for imparting axial movement to the sleeve. Rollers 52 are mounted on arms 53 attached to rack 51. Since pinion 50 is half the diameter of pinion 48, it will be appreciated that bearing sleeve 42 will be driven one-half the distance of spindle 44, which is the desired ratio. Thus, there will not under any circumstances be any creep of sleeve 42 incidental to the movement of spindle 44. As noted above, any of the stress relieving constructions of FIGS. 1–5 of the present invention may be incorporated into the embodiment of FIG. 6 so that this embodiment not only provides for positive movement of sleeve 42, but also provides for the stress relieving aspects of the present invention.

It can thus be seen that the periodic or cyclic relieving of the forces on the ball bearings as they pass across a force relieving area obviates the cumulative effect of an unbalance of forces on the bearing assembly which causes drift thereof, the cumulative effect being due to the rotation of the spindle. In this respect it will be appreciated that if forces tend to bias certain of the ball bearings in a certain direction and such forces are applied every time that the bearings move across a certain portion of the spindle or the bore, those forces will cause the bearings to continue moving in said certain direction to produce the drift of the bearing assembly. This drift would not occur if the rotation were not occurring. Also, as noted above, by periodically or cyclically relieving the forces on the ball bearings, the cumulative effect which causes drift is eliminated, even though the unbalance of forces continues to exist during rotation.

What is claimed is:

1. A spindle mounting construction comprising a housing, a bore in said housing defining a cylindrical bearing surface, a spindle having a portion located in said bore, a ball bearing assembly including a ball bearing retaining sleeve interposed between said spindle and said bearing surface for a substantial portion of the length of said bore, a plurality of sockets in said sleeve, a plurality of ball bearings mounted in said sockets in said sleeve for movement circumferentially and axially with said sleeve, said ball bearings extending for a substantial portion of the length of said sleeve and circumferentially thereof for engaging both said spindle and said bearing surface for maintaining said spindle in centered relationship in said bore while permitting both rotary and axial movement thereof, and force relieving area means associated with said ball bearings for periodically relieving the forces exerted on said ball bearings.

2. A spindle mounting construction as set forth in claim 1 wherein said force relieving area means comprises groove means across which said ball bearings pass.

3. A spindle mounting construction as set forth in claim 1 wherein said force relieving area means comprises annular groove means on said spindle.

4. A spindle mounting construction as set forth in claim 1 wherein said force relieving area means comprises a helical groove on said spindle.

5. A spindle mounting construction as set forth in claim 1 wherein said force relieving area means comprises first and second helical grooves on said sleeve extending in opposite directions.

6. A spindle mounting construction as set forth in claim 1 wherein said force relieving area means comprises a groove on said housing.

7. A spindle mounting construction as set forth in claim 6 wherein said cylindrical bearing surface comprises a second sleeve mounted in said housing and wherein said groove is located in said housing on the opposite side of said second sleeve from said ball bearing assembly.

8. A spindle mounting construction as set forth in claim 1 including first means for imparting axial movement to said spindle and second means for imparting axial movement to said sleeve in synchronized relationship with said axial movement of said spindle.

9. A spindle mounting construction as set forth in claim 8 wherein said force relieving area means comprises groove means across which said ball bearings periodically pass.

10. A spindle mounting construction comprising a bore, a spindle in said bore, ball bearing retaining means interposed between said spindle and said bore, socket means in said ball bearing retaining means, ball bearing means mounted in said socket means for mounting said spindle means for relative movement with respect to said bore, and groove means located relative to said ball bearing means across which said ball bearing means periodically pass for relieving forces which may exist between said ball bearing means and said socket means.

* * * * *